United States Patent Office 3,097,500
Patented July 16, 1963

3,097,500
TEMPERATURE CONTROL SYSTEM
Arthur Rowlatt More, Croydon, England, assignor of one-half to H. W. Wallace & Co. Limited, Croydon, England
Filed Aug. 21, 1961, Ser. No. 132,909
Claims priority, application Great Britain Sept. 7, 1960
5 Claims. (Cl. 62—55)

This invention relates to temperature control systems and has been devised with the object of providing an improved alternative to existing low temperature control systems involving the use of electrically operating thermostats controlling solenoid operated valves which regulate the flow of the coolant medium.

In such an electrically controlled system accurate temperature control within close limits is not possible because the coolant is either being supplied or withheld, there being no infinitely variable control by the thermostat between the "on" and "off" positions.

With such a system the solenoid operated valve may be manually preset to only pass a very small quantity of coolant when open and thus give a closer temperature control by restricting the rate of cooling and so reduce temperature overshoot; however, this prevents a rapid reduction in temperature when the equipment is first switched on or if any large mass is introduced into the cooling chamber.

The present invention consists in a chamber temperature control system comprising an enclosed reservoir of liquified gas, a first pipe leading from below the surface of the liquid in the reservoir to said temperature controlled chamber, a source of gas under constant pressure connected by a second pipe to the reservoir and ending above the liquified gas therein, a valve chamber having an inlet port supplied with pressure gas from said second pipe, a thermostatically operated valve in said inlet port which controls the area of said inlet port with change of temperature in the said temperature controlled chamber and a vent of restricted cross-sectional area from said valve chamber to atmosphere.

The invention further consists in a system as set forth in the preceding paragraph in which the thermostat operates to vary the size of an orifice associated with the pipe from the source of gas under pressure in response to changes in temperature in the chamber.

The orifice may be situated in a branch of the pressure pipe and be adapted to close as the chamber temperature rises and to open as the temperature falls. Alternatively the orifice may be situated in the pressure pipe and operate in conjunction with a control vent at the outlet side of the variable orifice which would be adapted to open when the chamber temperature rises and to close when the temperature falls.

Figure 1:
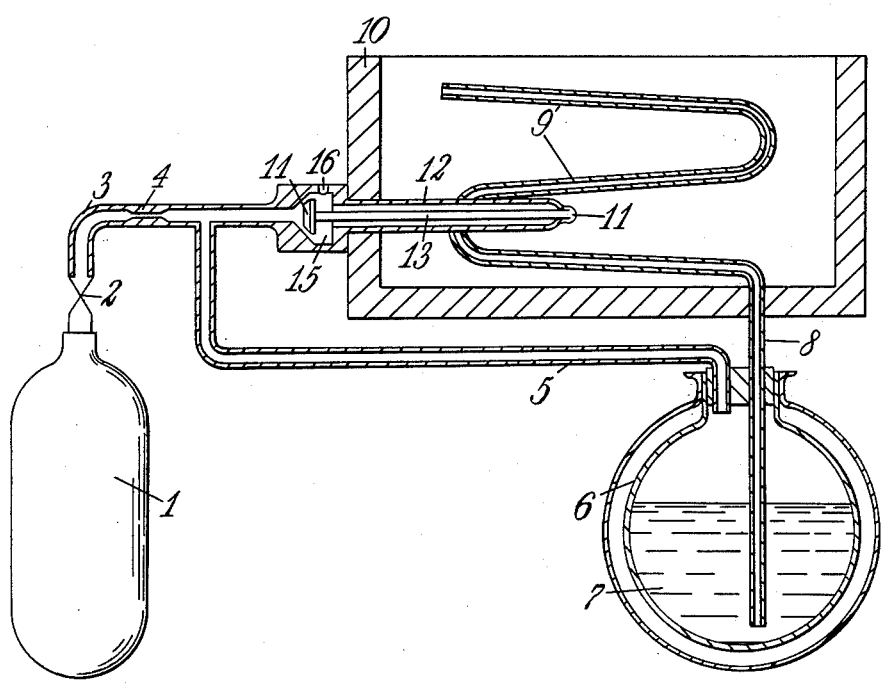
Figure 2:
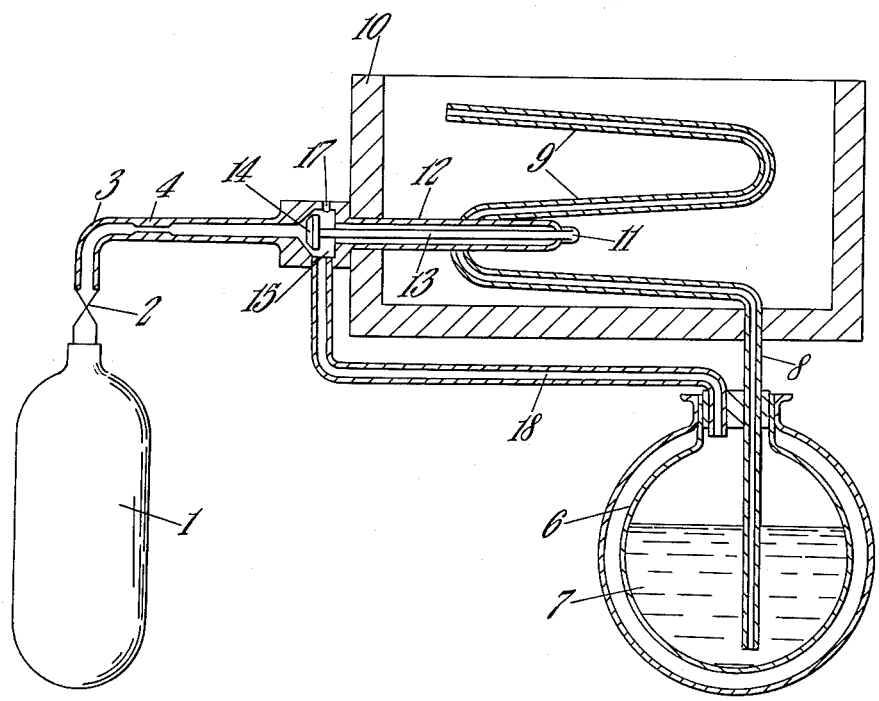

In the accompanying drawings FIGURES 1 and 2 show diagrammatically, by way of example only, two embodiments of the invention in which FIGURE 1 shows a bottle 1 of compressed gas equipped with an automatic pressure reducer and regulator 2 at its outlet is connected to a pressure cavity formed by the pipe 3 having a flow regulating constriction 4 situated a short way along its length. The constriction 4 is connected to a feed pipe 5 which enters a sealed Dewar flask 6 containing liquified gas 7. A long feed tube 8 extends from below the level of liquified gas in the flask through the seal of the flask and has its upper end connected to a serpentine heat exchanger 9 in the chamber 10 whose temperature is to be controlled. By this arrangement the gas under pressure tends to force the liquified gas into the chamber until a balance is achieved.

The heat exchanger is situated near the head of a thermostat 11 which extends into the chamber. The thermostat has an outer jacket 12 containing an expansion rod 13 having a valve head 14 which fits in a tapered orifice in a valve chamber 15 which is vented to atmosphere at 16 at one side of the valve head 14 and connected through the orifice at the other side of the valve head to a short branch pipe coupled to the feed pipe 5 between the constriction 4 and the Dewar flask 6.

When the temperature in the chamber 10 is above that which is required, the thermostat's orifice is reduced in size and thus the gas which has passed through the constriction 4 builds up pressure on the surface of the liquified gas 7 contained in the Dewar flask 6 and forces this liquid up the feed tube 8 and into the heat exchanger 9 in which it evaporates so reducing the chamber's temperature. As the thermostat cools, its orifice gradually opens and reduces the gas pressure which is supporting the column of the liquid coolant and thus the level of the liquid is adjusted to that which is necessary to maintain the required temperature.

In the alternative form of the invention shown in FIGURE 2, there is illustrated a similar system to that of FIGURE 1 and in which, where applicable, like reference numerals are used to indicate like parts. In this embodiment the pressurised gas is fed from the bottle 1 direct to one side of the thermostat's orifice and the other side leads from the valve chamber 15 to both a small control vent 17 and also to a pressure tube 18 leading to the Dewar flask 6 to exert pressure on the surface of the liquid coolant 7 so as to raise the level of the liquid in the heat exchanger 9.

The thermostat 11 in this embodiment functions in a reverse sense to that in FIGURE 1, inasmuch as the outer jacket 12 in this case is the expansion member operative to move the valve head 14 in accordance with temperature changes. When the flow rate of the thermostat's adjustable orifice exceeds that of the vent 17, gas pressure will build up on the surface of the liquid coolant and so raise the level of the liquid in the tube 8 leading to the heat exchanger. As the thermostat's orifice is closed until its flow rate is reduced to that of the vent the pressure of the gas will drop proportionately and reduce the length of the column of liquid coolant.

It is to be understood that the above description is by way of example only and that details for carrying the invention into effect may be varied without departing from the scope of the invention claimed.

I claim:

1. A chamber temperature control system comprising an enclosed reservoir of liquified gas, a first pipe leading from below the surface of the liquid in the reservoir to said chamber the temperature of which is to be controlled, a source of gas under constant pressure, housing means providing a valve chamber having an inlet port and a vent to the atmosphere of restricted cross-sectional area, means connecting the inlet port of the housing means to the source of gas under pressure, a thermostatically operated valve in said inlet port for controlling the area of the port in accordance with changes in the temperature of the temperature-controlled chamber, and a second pipe in communication with the housing means at one side of the inlet port and ending above the liquified gas in the reservoir.

2. A chamber temperature control system as defined by claim 1, in which the second pipe is in connection with the housing means at the side of the port in the valve chamber through which the gas from the source enters.

3. A chamber temperature control system as defined by claim 1, in which the second pipe is connected to the housing means at the outlet side of the inlet port in the valve chamber.

4. A chamber temperature control system as defined by claim 1, in which the source of gas under constant pressure is a container of compressed gas having a pressure reducing and regulating valve in the outlet therefrom, the means connecting the housing means to the source of gas under pressure including a duct, and a flow constricting means positioned in said duct.

5. A chamber temperature control system as defined by claim 1, in which said first pipe located within the temperature-controlled chamber is of serpentine form to act as a heat exchanger, the end of said first pipe remote from the reservoir being vented to the atmosphere.

References Cited in the file of this patent

UNITED STATES PATENTS

| | | |
|---|---|---|
| 966,076 | Bobrick | Aug. 2, 1910 |
| 2,479,840 | Johnson | Aug. 23, 1949 |
| 2,479,867 | Rosebaugh | Aug. 23, 1949 |
| 2,482,778 | Joerren | Sept. 27, 1949 |